Oct. 18, 1960 R. R. COOK 2,956,423
UNIVERSAL JOINT
Filed Aug. 8, 1958
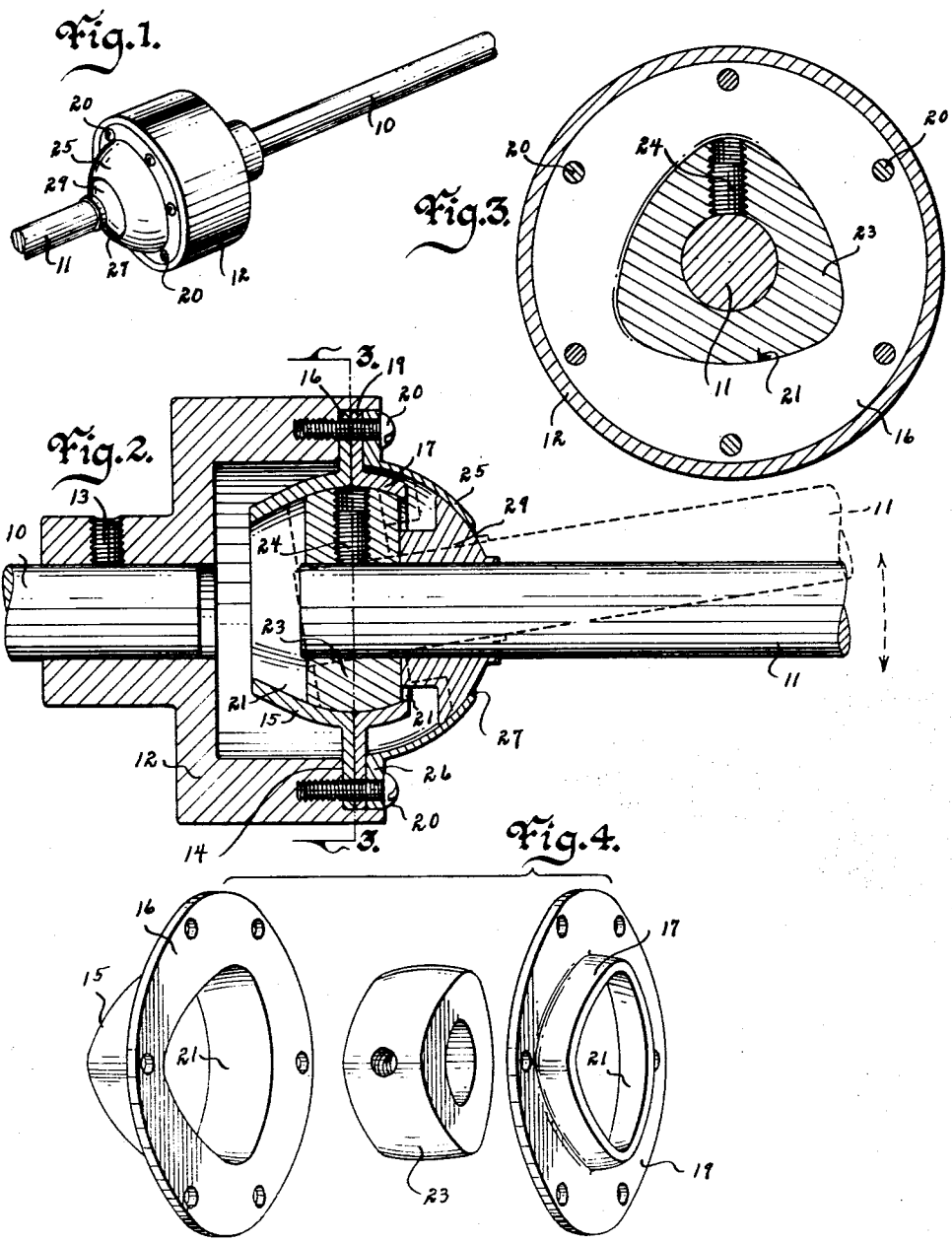
Witness
Edward P. Seeley
Inventor
Roger R. Cook
by M. Talbert Dick
Attorney United States Patent Office 2,956,423
Patented Oct. 18, 1960

2,956,423
UNIVERSAL JOINT
Roger R. Cook, 2202 S. Union St., Des Moines, Iowa
Filed Aug. 8, 1958, Ser. No. 753,974
6 Claims. (Cl. 64—7)

This invention relates to the transmission of rotary power at an angle and more particularly to a universal transmission joint.

Many types of equipment require the use of a universal joint. Usually such joints, if they are to transmit power, consist of either a flexible webbing or a knuckle with each shaft hinged thereto. Either device presents an unbalanced mechanism and one of considerable power loss. The best joint connection, when power is not to be transmitted, is a ball and socket. However, a ball and socket structure does not connect one shaft to another shaft against relative rotation.

Therefore, one of the objects of my invention is to provide a ball and socket type joint that secures the ball portion and socket portion against relative rotation, thereby making possible the transmission of rotary power from one shaft to another shaft.

A further object of this invention is to provide a universal power joint that has little power loss.

A still further object of this invention is to provide a universal power joint that is quiet in operation.

A still further object of this invention is to provide a universal closed power joint that permits supply lubrication.

Still further objects of my invention are to provide a universal transmission joint that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a perspective view of my power joint ready for use,

Fig. 2 is an enlarged longitudinal sectional view of my universal joint, and more fully illustrates its construction, Fig. 3 is a cross sectional view of the device and is taken on line 3—3 of Fig. 2, and Fig. 4 is an enlarged exploded view of the socket and core portions of my universal joint.

In the drawings I have used the numeral 10 to designate the drive shaft and the numeral 11 to designate the driven shaft. On the end of the shaft 10 is a cup bearing 12, rigidly held thereon by any suitable means such as a screw 13 threaded through the rear end boss of the bearing cup to engage the shaft 10, as shown in Fig. 1. The bearing cup has its open end extending forwardly and near its rim is an internal circular shoulder 14. The numeral 15 designates the rear female socket portion having a flange 16 in the cup bearing and engaging the shoulder 14. The numeral 17 designates the forward female socket portion having a flange 19 adapted to rest in the end area of the cup bearing and onto the flange 16. Cap screws 20 extend through the flanges 16 and 19 and are threaded into the cup bearing to detachably hold the two sockets 15 and 17 together and to the cup housing. In each socket is a longitudinal opening 21. The two openings 21 complement each other and combined together as shown provide a socket having its inner wall curved outwardly longitudinally or concave, as shown in Fig. 2. Also, while the two openings are open their inner walls are not perfect circles in cross section, but each is that of an equal triangle construction having slightly outwardly curved sides and rounded corners, as shown in Fig. 3. The numeral 23 designates the ball portion detachably fixed on the rear end portion of the driven shaft by a screw or like 24 threaded through the portion 23 and engaging the shaft 11. The periphery of the core ball member 23 is not a perfect circle in cross section but is that of an equal triangle construction having slightly curved sides and rounded corners, as shown in Fig. 3. Also, the longitudinal periphery of the core 23 is curved outwardly or convex as shown in Fig. 4. The outside outline of the ball core member 23 closely complements the inside outline of the female socket portions as shown in Fig. 2. Thus, the ball core may swing and slide laterally in the socket portions as shown by broken lines in Fig. 2, but due to the triangle construction of the core and socket, the core portion does not have independent rotation relative to the socket. Any suitable means may be used to retain the ball core 23 in the socket. In the drawings I use a circular curved arcular collar 25 having a flange 26. In assembly this collar is placed onto the flange 19, and the cap screws 20 also extend through it. The numeral 27 designates an enlarged opening in the center of the collar for the shaft 11 to loosely extend therethrough. The numeral 29 designates a retainer bearing embracing the shaft 11 having its rear end in engagement with the ball core 23 and its forward end rounded to slidably engage the inside of the collar 25.

By the construction described the shaft 11 may be placed at an angle to the shaft 10, similar to that of shafts using an ordinary ball and socket. However, unlike the common ball and socket, the triangular construction of the core and socket will prevent independent rotation of the shafts and when either the shaft 10 or 11 is rotated the other shaft will be rotated accordingly.

Some changes may be made in the construction and arrangement of my universal joint without departing from the real spirit and purpose of my invention, and it is my intention to cover by my claims, any modified forms of structure or use of mechanical equivalents which may be reasonably included within their scope.

I claim:

1. In a socket connection for driven shafts, a first shaft and a second shaft, a cup member having an open and a closed end with the open end defined by a circumferential flange, a concentrically located hub projecting from the closed end of said cup member, means securing said hub on the end of said first shaft, the interior of said flange at its outer end having a circumferential recess providing an endless annular shoulder substantially normal to the axis of said first shaft, a socket-providing member comprising two separable sections and providing a forward opening into which an end of said second shaft extends, said socket sections having complementary annular and outwardly extending marginal flanges contiguously engaging one another, fastening means securing said flanges together and seated against said cup flange-provided shoulder, a bearing member fast on the aforementioned end of said second shaft and received in said cup member-carried socket, said bearing member and the interior of said socket being triangular in cross section and providing complementary engaging surfaces which are longitudinally curved in the arc of a circle, whereby to provide three points of resistance to relative turning movement of said first and second shafts while permitting relative swinging movement of same in three directions, a collar on said second shaft and having its inner end engaging said bearing, the outer end of said collar having an annular sphere segment enlargement providing an endless outwardly extending flange, and an annular sphere segment shell detachably carried by said cup member and which overlies at least the marginal flange of said collar enlargement, said shell having an oversized hole through which said second shaft extends.

2. The structure of claim 1, and wherein said shell has an annular marginal flange overlying said socket section flanges and which is anchored to said cup flange shoulder by said socket section fastening means.

3. A connector for transmitting torque between axially disposed shafts and permitting relative angular relation therebetween comprising a cup member including a recess portion and means for connection to one axially disposed shaft, said cup members including a peripheral shoulder surrounding said recess portion, a socket-forming member comprising separable sections including contiguous marginal flanges juxtaposed on said peripheral shoulder of said cup member, one of said separable sections including an axial opening for receiving the other axial shaft therethrough, a ball member retained within said separable sections and including means for connection to said other axially disposed shaft, said ball member and separable sections having complementary, longitudinally and arcuately curved surface portions and having a polygonal cross section for forming a plurality of points of resistance against relative rotation between said axially aligned shafts about their longitudinal axis, and retaining means engaging the marginal flanges of said sections and retaining the same in a fixed position on said cup member.

4. The structure of claim 3, said other separable section including an open portion communicating with said cup recess and being disposed therein.

5. The structure of claim 3, an axially apertured collar abutting said one separable section and including a spherical outer surface portion, an axially apertured retaining shell overlying said collar and including a surface portion complementary to the spherical outer surface of said collar, said shell including a peripheral flange overlying the flanges of said separable sections and retained thereon by said retaining means.

6. The structure of claim 4, an axially apertured collar abutting said one separable section and including a spherical outer surface portion, an axially apertured retaining shell overlying said collar and including a surface portion complementary to the spherical outer surface of said collar, said shell including a peripheral flange overlying the flanges of said separable sections and retained thereon by said retaining means.

References Cited in the file of this patent

UNITED STATES PATENTS

| | | |
|---|---|---|
| 218,278 | Kimball | Aug. 5, 1879 |
| 1,286,945 | Coates | Dec. 10, 1918 |
| 1,328,983 | Coates | Jan. 27, 1920 |
| 1,799,488 | Webster | Apr. 7, 1931 |
| 1,832,794 | Shepard | Nov. 17, 1931 |